United States Patent [19]

Bradley, Jr.

[11] 4,131,341
[45] * Dec. 26, 1978

[54] OPHTHALMIC DEVICE

[76] Inventor: James B. Bradley, Jr., 110 Monteleon Dr., West Monroe, La. 71291

[*] Notice: The portion of the term of this patent subsequent to Jun. 28, 1994, has been disclaimed.

[21] Appl. No.: 790,382

[22] Filed: Apr. 25, 1977

[51] Int. Cl.² .......................... G02C 5/02; G02C 5/12
[52] U.S. Cl. .................................. 351/132; 351/128; 351/137; 351/139
[58] Field of Search ................ 351/132, 128, 137, 139

[56] References Cited

U.S. PATENT DOCUMENTS

| 1,132,760 | 3/1915 | Baker | 351/132 |
| 1,205,716 | 7/1915 | Day | 351/132 |
| 4,032,223 | 6/1977 | Bradley | 351/132 |

Primary Examiner—Paul A. Sacher
Assistant Examiner—Rodney B. Bovernick
Attorney, Agent, or Firm—Norvell E. Von Behren

[57] ABSTRACT

A novel improved ophthalmic device which comprises a unique one-piece preformed detachable nosepiece for use with an ophthalmic eyeglass frame wherein the nosepiece is formed with a generally box shaped forward portion having a vertical elongated slot formed in the forward portion and having a nose bridge mount formed at the rear surface of the box shaped portion. The nose bridge portion has a pair of rearwardly and outwardly extending projections for positioning of the bridge of the nose of the user which provides a hard surface for positioning and retaining the ophthalmic eyeglass frame which is used with the one-piece nosepiece in a fixed position. A generally concave surface formed between the projections is formed in the shape of the bridge of the user's nose and is narrower at the top than at the bottom thereby providing a concave shape that retards slippage of the nosepiece. Friction increasing means may be provided on the concave surface for increasing the friction of the concave surface to prevent slipping of the nosepiece on the nose of the user and to provide a soft cushioned surface for greater comfort to the user.

10 Claims, 12 Drawing Figures

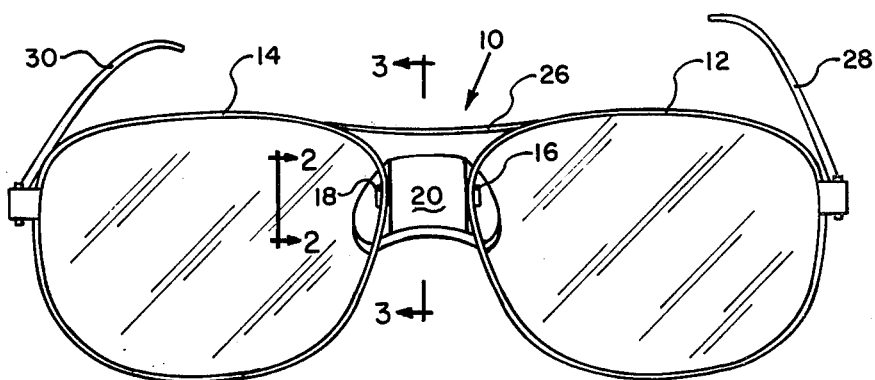

OPHTHALMIC DEVICE

BACKGROUND OF THE INVENTION

This invention relates generally to an improved one-piece preformed detachable nosepiece and to an improved ophthalmic device using the one-piece preformed detachable nosepiece and in particular relates to a new and novel device which may be used by an optometrist or the like to insure a proper fit and a more comfortable fit for each individual patient. The new and improved one-piece preformed detachable nosepiece may be incorporated into an ophthalmic eyeglass frame of the type usually prescribed by the optometrist.

The usual procedure for the selection and fitting of eyeglasses by an optometrist generally involves a two-step process wherein in the first step the user's eyes are checked by the optometrist or the like to ascertain the precise degree of correction required in the lens of the eyeglass. After this has been determined, the patient is generally escorted to a separate sitting room where a large selection of styles and colors of eyeglass frames are shown to him. After a long series of trial and error fitting of the various styles and colors of glasses on the user, the final selection is generally made by the patient and his particular set of glasses are then tailor-made by the optometrist by grinding the prescription formula for the lens and inserting the proper lens in the selected frame.

Such fitting techniques, while many times successful, are not necessarily always successful since standard frames heretofore known generally comprise one of two types which are not necessarily satisfactory for all users. Such frames generally utilize molded nosepieces made of plastic and having relatively small wedge like contact areas with the nosepiece being fixed to the eyeglass frames so that no front-to-rear adjustment is possible to take into account different size and shape noses. The other type of common nosepiece in use with frames generally sold today consists of a type of floating nosepiece which may be formed of a metal face or sometimes a plastic face with the faces being self-adjusting and used as a wedge to wedge the bridge of the nosepiece into the nose of the user.

It should be recognized that these types of nosepiece mounts are often considered uncomfortable and can cause severe pressure indentation in the skin of the nose which can be unsightly and irritating after a prolonged use of the poorly fit eyeglass. An ill-fitted pair of eyeglasses such as this often causes a second problem to the user which is the problem of slippage of eyeglasses on the user's nose which can be very annoying to say the least. It is felt that such slippage occurs because of the poor frictional fit on the nose of the user resulting primarily from the ill-fitted nosepieces on the eyeglass.

For a more fuller understanding of the prior type of nosepieces available for eyeglasses, reference should be made to the following U.S. patents which all generally teach what has been before described as the fixed type of nosepiece: U.S. Pat. Nos. 115,302, issued to E. M. Splaine, June 20, 1939; 129,710, issued to H. J. Langknecht, Sept. 30, 1941; 200,667, issued to V. A. Downie et al., Mar. 23, 1965; 3,345,121, issued A. De Angelis, Oct. 3, 1967; 3,391,976, issued to F. W. Lindblom, July 9, 1968; 2,612,076, issued to W. Dietz, Sept. 30, 1952; 3,189,913, issued to G. R. Hoffmaster, June 15, 1965; 3,701,592, issued to J. J. Fernandez, Oct. 31, 1972; 3,758,203, issued to H. Lipchik et al., Sept. 11, 1973; 3,365,263, issued to D. P. Allen, Jan. 23, 1968; 2,148,397, issued to F. Bock, Feb. 21, 1939; 2,006,917, issued to C. J. Haag, July 2, 1935; 2,345,065, issued to G. E. Nerney, Mar. 28, 1944; 2,354,603, issued to R. Malcolm, July 25, 1944. These patents, while not considered especially pertinent to the subject application, are cited for the purpose of showing the extensive state of art and the extensive need for improvement in nosepiece designs.

Eyeglass nosepieces of the floating type are typified by the following U.S. patents which are considered more pertinent to the applicant's invention inasmuch as they overcome the problems inherent in the fixed type of nosepieces but are not necessarily an improvement over the applicant's new and novel invention; U.S. Pat. Nos. 3,476,468, issued to J. A. Fortenberry, Nov. 4, 1969; 3,515,467, issued to D. A. Stewart, June 2, 1970; 2,640,391, issued to E. H. Mosley, June 2, 1953; 3,233,956, issued to A. De Angelis, Feb. 8, 1966; 3,233,250, issued to S. Jonassen, Feb. 8, 1966.

CROSS REFERENCES TO RELATED APPLICATIONS

Allowed patent application Ser. No. 525,842, filed 11/21/74 by James B. Bradley, Jr. and entitled "Ophthalmic Device and Method."

Allowed patent application Ser. No. 573,907, filed 5/2/75 by James B. Bradley, Jr. and entitled "Ophthalmic Method and Device."

Recently filed patent application Ser. No. 783,946, filed 4/1/77 by James B. Bradley, Jr. and entitled "Ophthalmic Method and Device."

In addition to the before cited reference patents by the applicant, the examiner cited the following patents in the before mentioned Bradley application Ser. No. 525,842:

E. B. Meyrowitz, No. 329,474, issued 11/03/1885
W. H. Eccleston et al., No. 375,541, issued 12/27/1887
J. A. Fortenberry, No. 3,476,468, issued 11/4/1969
Boucle, No. 1,245,938, (France) issued 10/3/1960
A. S. Weaver, No. 636,595, issued 11/7/1899.

The examiner also cited the following patents in the before mentioned Bradley application Ser. No. 573,907:

J. A. Fortenberry, No. 3,476,468, issued 11/4/1969
A. S. Weaver, No. 636,595, issued 11/7/1899
G. H. Emerson, No. 388,545, issued 8/28/1888.

SUMMARY OF THE INVENTION

In order to overcome the problems inherent in the prior devices herein before described, there is provided by the applicant's invention a new and novel one-piece preformed detachable nosepiece for use with an ophthalmic eyeglass frame having a generally box shaped forward portion with a vertical elongated slot extending from one side surface to an opposed side surface and having a nose bridge mount formed on the rear of said box like portion with the nose bridge mount being formed with a pair of rearwardly and outwardly extending projections for positioning on the bridge on the nose of the user to provide a large surface for positioning and retaining the ophthalmic eyeglass frame in a fixed position with the pair of rearwardly and outwardly extending projections having a generally concave surface formed between them and being formed in the shape of the bridge of the user's nose and being narrower at the top than at the bottom to provide a concave shape that retards slippage of the nosepiece on the nose of the user. The new and novel nosepiece may also be mounted on a pair of lens mounts and locked thereto by means of locking means to lock the nosepiece rigidly in a predetermined position with the elongated slot and the locking means allowing the nosepiece to be vertically and angularly adjusted to fit the bridge of the user's nose.

Accordingly it is an object of the invention to provide a new and novel device for use in an ophthalmic device which allows the user to alleviate the problems encountered in the proper fitting of prior type eyeglass frames.

Another object of the invention is to provide a new and novel removable one-piece preformed detachable nosepiece which is designed to permit vertical and angular adjustment of the nosepiece to fit the bridge of the user's nose when used with an eyeglass frame.

Still yet another object of the invention is to provide an ophthalmic device which has a removable one-piece preformed detachable nosepiece which may be adjusted front-to-rear and vertically and which may be readjusted relatively quickly by the optometrist and then locked in place by a locking device.

Yet another object of the invention is to provide a new and novel detachable nosepiece and ophthalmic device using the nosepiece which allows the user of the eyeglass frame to be more fully satisfied with the accompanying fit and which relieves heretofore known pressures on the nose bridge of the user.

Still yet another object of the invention is to provide a new and novel ophthalmic frame and detachable nosepiece which has provided thereon a non-slip, soft, porous spongy-like coating applied thereto to aid in preventing the nosepiece from slipping on the bridge of the user's nose.

These and other objects and advantages of the invention will become apparent from a study of drawings attached herewith and from a reading of the description of the preferred embodiment to be described more fully hereinafter.

BRIEF DESCRIPTION OF THE DRAWINGS

FIG. 1 is a front view of the new and novel ophthalmic device showing the new and novel one-piece preformed detachable nosepiece positioned between the pair of lens mounts;

FIG. 2 is a view, taken along line 2—2 of FIG. 1, showing the mounting tab for the one-piece preformed detachable nosepiece;

FIG. 3 is a sectional view, taken along line 3—3 of FIG. 1, showing the one-piece preformed detachable nosepiece positioned and locked to the mounting tab and positioned on the nose of the user of the device;

FIG. 4 is a front view, taken along line 4—4 of FIG. 3, showing the detachable nosepiece and the pair of rearwardly and outwardly extending projections formed on the box shaped forward portion;

FIG. 5 is a sectional view, taken along line 5—5 of FIG. 3, showing the locking means in the form of a male-female fastener locking the one-piece preformed detachable nosepiece to the mounting tab;

FIG. 6 is a side view, taken along line 6—6 and FIG. 7 is a side view taken along line 7—7, both of FIG. 5, showing the ends of the male-female fastener shown in FIG. 5;

FIG. 8 is a side view, taken along line 8—8 of FIG. 4, showing the rearwardly and outwardly extending projections on the box shaped forward portion of the one-piece nosepiece and showing also the vertical elongated slot formed in the forward portion of the nosepiece;

FIG. 9 is a top view, taken along line 9—9 of FIG. 4, showing the shape of the generally concave surface formed between the projections and also showing the friction increasing means on the concave surface to prevent slipping of the nosepiece on the nose of the user and to provide a soft cushioned surface for greater comfort to the user;

FIG. 10 is a bottom view, taken along line 10—10 of FIG. 4, showing the bottom of the concave surface and also showing the friction increasing means as before mentioned;

FIG. 11 is a rear view, taken along line 11—11 of FIG. 8, showing the complete concave surface formed between the rearwardly and outwardly extending projections on the one-piece preformed nosepiece and also showing the friction increasing means applied across the entire concave surface; and FIG. 12 is a sectional view, taken along line 5—5 of FIG. 3, showing a modification of the preferred embodiment as shown in FIG. 5 of the drawings.

DESCRIPTION OF THE PREFERRED EMBODIMENT

Referring now to FIGS. 1 and 2 of the drawing and especially to FIG. 1 there is shown the new and novel ophthalmic device generally by the numeral 10 which comprises a pair of lens mounts 12 and 14 having formed thereon facing mounting tabs 16 and 18 which are designed to receive the new and novel one-piece preformed detachable nosepiece 20 between the mounting tab 16 and 18 and being held in place by means of locking means in the form of a mating male-female fastener as will be described more fully hereinafter.

The mounting tab 16 and 18 have formed in them facing holes 22 and 24 as shown in FIG. 2 and also FIG. 5 of the drawing. The ophthalmic device also has a bridge 26 spanning the lens mounts 12 and 14 and attached thereto by means well known in the art. A pair of temples 28 and 30 are hingedly attached to the lens mounts 12 and 14 at the sides thereof by means also well known in the art.

Referring now to FIGS. 3-5 of the drawing there is shown in more detail the new and novel one-piece preformed detachable nosepiece 20 which comprises a generally box shaped forward portion 32 having formed thereupon a pair of opposed side surfaces 34 and 36 for positioning between the opposing mounting tabs 16 and 18 as shown in FIG. 1 of the drawing.

The box shaped forward portion 32 has formed thereupon a front surface 38 and a rear surface 40, and also has formed therein and between the opposed side surfaces 34 and 36, a vertical elongated slot 42 extending from one opposed side surface 34 to the other opposed side surface 36. The vertical elongated slot 42 is designed to receive the locking means comprising in the preferred embodiment of the invention, a removable male-female fastener in the form of a mating male bolt 44 and a female receptacle 46. The male bolt 44 and the female receptacle 46 both have formed thereon on the outer side thereof, a head 48 with an elongated screwdriver groove 50 for tightening the two mating parts together to form a locking fit of the nosepiece 20 between the mounting tabs 16 and 18 on the ophthalmic device 10. The opposed side surfaces 34 and 36 of the generally box shaped forward portion 32 may be abraded as shown in FIG. 8 of the drawing by the hatching numeral 72 to insure a tighter fit between the nosepiece 20 and the mounting tabs 16 and 18.

Turning now to FIGS. 8-11 there is shown in these figures the nose bridge mount of the detachable nosepiece 20 which is formed on the rear surface 40 of the box shaped forward portion 32 and which is formed with a pair of rearwardly and outwardly extending projections 52 and 54 for positioning on the bridge of the nose of the user of the ophthalmic eyeglass frame as shown in FIG. 3 of the drawing with the dash line 56 showing the general outline of a nose bridge of a user and with the dash lines 58 and 60 in FIG. 4 showing also the side outline of the nose of a user of the device.

Referring now more particularly to FIGS. 9-11 there are shown various views of the one-piece preformed detachable nosepiece and showing the nose bridge mount formed on the rear surface 40 of the box shaped forward portion 32 with the pair of rearwardly and outwardly extending projections 52 and 54 having formed there between a generally concave surface 62 which is formed in the shape of the bridge of the user's nose and is formed having a narrower upper portion 64 at the top of the nosepiece in comparison to a wider bottom portion 66 to provide a preformed shape that fits the entire bridge of the nose as compared to the before described prior art nosepieces which are formed with side fitting wedges that wedge against the downwardly tapering nose of the user to hold the eyeglass frame in place on the user's nose. By the use of a generally concave surface 62, being preformed to the user's particular nose as described more fully in the applicant's copending application herein before described, a much greater bearing surface is obtained on the user's nose to carry the weight of the eyeglass frame with the lenses thereby alleviating the before described problem of wedge-like depressions being formed in the user's nose resulting in uncomfortable fitting of eyeglass frames.

In order to make the subject new and novel ophthalmic device more comfortable, there may be provided on the concaved surface 62 a friction increasing means 68 which is designed to increase the friction on the concave surface 62 to prevent slipping of the nosepiece 20 on the nose of the user and also to provide a soft cushioned surface on the nose for greater comfort to the user. The friction increasing means 68 would preferably be formed of a plastic porous-like spongy material in the preferred embodiment which may be either sprayed on the concaved surface 62 or may be applied thereupon by means of a brush or some other suitable device. When formed thusly, the porous-like spongy material with friction increasing means 68 will tend to grip the nose of the user and will prevent the eyeglass frame with the detachable nosepiece from sliding down the nose of the user which is a universal problem with any eyeglass owner.

Returning now to FIGS. 3 and 5 of the drawing it can now be seen that the detachable nosepiece 20 is designed to permit a vertical adjustment of the nosepiece by means of the vertical elongated slot 42 and also to permit an angular adjustment of the nosepiece as a result of the positioning of the female receptacle 46 along with its mating male bolt 44 within the vertical elongated slot 42. As a result, the user of the device with the new and novel detachable nosepiece attached is able to position the nosepiece in a comfortable position on the bridge of his nose and is able to adjust the level of the eyeglass lens in relation to the plane of his eyes so that the lens conforms more accurately to the ophthalmic prescription. Whenever a desired vertical position of the nosepiece 20 is obtained as well as angular adjustment or panascopic tilt of the nosepiece is also obtained, the removable male-female fastener or locking means is tightened to draw the locking means together against the facing nosepiece mounting tabs 16 and 18 and against the opposed side surfaces 34 and 36 of the box shaped forward portion 32.

It may also be desirable to provide an improved pivotable connection of the nosepiece 20 to insure that a tight non-rotation of the nosepiece is obtained once the desired degree of front-to-rear positioning is achieved. This may be insured by the use of shims or friction members between the facing nosepiece mounting tabs 16 and 18 and the opposed side surfaces 34 and 36. The shim may take the form of the shim as shown in the applicant's copending patent application Ser. No. 573,907, filed May 2, 1975 which is shown in FIGS. 6 and 7 of the drawing of that case with the shim being numbered 46 in that case and having a series of radially positioned teeth 48 formed on the surfaces of the shim. When formed in this manner using the friction increasing shim, the arrangement of the parts shown in FIG. 5 of the applicant's drawing would then be such as shown in FIG. 12 of the same drawing with a shim, shown by the numeral 70, being positioned between the facing nosepiece mounting tabs 16 and 18 and between the opposing side surfaces 34 and 36. In addition to using a shim as shown in FIG. 12 of the drawing, the opposing side surfaces 34 and 36 may also be abraded as shown in FIG. 8 of the drawing by the hatching 72 to insure a much tighter fit than heretofore possible with prior art devices.

The one-piece detachable nosepiece 20 may be molded of clear plastic and flesh tinted if desired in order to be more asthetically attractive when positioned on the eyeglass frame and the use of the applicant's new and novel detachable nosepiece as shown in the drawings permits any dimension to be obtained between the lenses by varying the distance of the opposed side surfaces 34 and 36 to fit particular eyeglass frames and sizes. As an alternate, the detachable nosepiece may be formed with a fixed slot instead of a vertical elongated slot and the nosepiece mounting tabs be formed with elongated slots to permit the nosepiece to be adjusted vertically in the mounting tab slots as to being adjustable vertically in the nosepiece slot as shown in the preferred embodiment.

In summary, there has been described in the foregoing patent application a novel, improved ophthalmic device which comprises a unique fitting eyeglass frame which has a unique one-piece preformed detachable nosepiece which may be adjusted vertically and front-to-rear to permit adjustment of the lens to an exact eye level in relation to the plane of the user's eyes so that the len conforms more accurately to the ophthalmic prescription. The vertical elongated slot formed in the box shaped forward portion of the detachable nosepiece of the subject invention may be formed approximately three-quarters of an inch in length thereby allowing a vertical adjustment of approximately three-quarters of an inch with the slot being sized of a shorter length down to approximately one-quarter of an inch or less if desired.

From the foregoing, it is apparent that all of the objects and advantages of the invention have been obtained by the new and novel device as described in the preferred embodiment and it should also be apparent that many changes can be made in the arrangement of the parts without departing from the spirit and scope of the invention as described in the following claims.

Having described my invention, I claim:

1. A one-piece preformed detachable nosepiece for use with an ophthalmic eyeglass frame having a pair of facing nosepiece mounting tabs formed thereon, the nosepiece being designed to permit vertical and angular adjustment to fit the bridge of the user's nose precisely and to permit the adjustment of the level of the eyeglass lens in relation to the plane of the user's eyes so that the lens conforms more accurately to the ophthalmic prescription, comprising:

(a) a generally box shaped forward portion having formed thereupon a pair of opposed side surfaces, for positioning between the mounting tabs, and having formed thereupon a front and a rear surface, said box shaped forward portion having formed therein and between said opposed side surfaces a vertical elongated slot extending from one opposed side surface to the other opposed side surface;

(b) a nose bridge mount formed on the rear surface of said box shaped portion and being formed with a pair of rearwardly and outwardly extending projections for positioning on the bridge of the nose of the user of the ophthalmic eyeglass frame and to provide a large surface for positioning and retaining the ophthalmic eyeglass frame in a fixed position; and (c) a generally concaved surface formed between said pair of projections and being formed in the shape of the bridge of the user's nose and being narrower at the top than at the bottom thereby providing a concave shape that retards slippage of the nosepiece.

2. The nosepiece as defined in claim 1 wherein said concaved surface has formed thereon a friction increasing means for increasing the friction on said concaved surface to prevent slipping of the nosepiece on the nose of the user of the ophthalmic eyeglass frame and to provide a soft cushioned surface for greater comfort to the user.

3. The nosepiece as defined in claim 1 wherein said opposed side surfaces of said generally box shaped forward portion are abraded.

4. The nosepiece as defined in claim 3 wherein said concaved surface has formed thereon a friction increasing means for increasing the friction on said concaved surface to prevent slipping of the nosepiece on the nose of the user of the ophthalmic eyeglass frame and to provide a soft cushioned surface for greater comfort to the user.

5. An ophthalmic device, comprising:

(a) a pair of lens mounts, each lens mount having a facing mounting tab formed thereon;

(b) a bridge spanning said lens mounts and attached thereto;

(c) a pair of temples hingedly attached to said lens mounts;

(d) a one-piece preformed detachable nosepiece having a generally box shaped forward portion formed thereupon and having a pair of opposed side surfaces for positioning between said lens mounts and between said mounting tabs and further having a front and rear surface, said box shaped forward portion having formed therein and between said opposed side surfaces a vertical elongated slot extending from one opposed side surface to the other opposed side surface;

(1) a nose bridge mount formed on the rear surface of said box shaped portion and being formed with a pair of rearwardly and outwardly extending projections for positioning on the bridge of the nose of the user of the ophthalmic eyeglass frame and to provide a large surface for positioning and retaining the ophthalmic eyeglass frame in a fixed position;

(2) a generally concaved surface formed between said pair of projections and being formed in the shape of the bridge of the user's nose and being narrower at the top than at the bottom thereby providing a concave shape that retards slippage of the nosepiece; and (e) locking means, positioned within said vertical elongated slot and attached to said mounting tabs for locking said nosepiece rigidly between said mounting tabs in a predetermined position.

6. The ophthalmic device as defined in claim 5 wherein said locking means comprises a removable male-female fastener.

7. The ophthalmic device as defined in claim 5 wherein said concaved surface has formed thereon a friction increasing means for increasing the friction on said concaved surface to prevent slipping of the nosepiece on the nose of the user of the ophthalmic device and to provide a soft cushioned surface for greater comfort to the user.

8. The ophthalmic device as defined in claim 5 wherein said opposed side surfaces of said generally box shaped forward portion are abraded.

9. The ophthalmic device as defined in claim 8 wherein said concaved surface has formed thereon a friction increasing means for increasing the friction on said concaved surface to prevent slipping of the nosepiece on the nose of the user of the ophthalmic device and to provide a soft cushioned surface for greater comfort to the user.

10. The ophthalmic device as defined in claim 5 further comprising a shim being positioned between each mounting tab and each opposed side surface and further comprising said locking means being positioned within said shims.

* * * * *